United States Patent [19]

Horaguchi et al.

[11] Patent Number: 4,897,248

[45] Date of Patent: Jan. 30, 1990

[54] METHOD FOR TREATING EXHAUST GAS

[75] Inventors: Mitsuhiro Horaguchi; Shigechika Tomisawa; Yukio Iida; Joji Tonomura, all of Yokohama, Japan

[73] Assignee: Mitsubishi Jukogyo Kabushiki Kaisha, Tokyo, Japan

[21] Appl. No.: 120,772

[22] Filed: Nov. 13, 1987

Related U.S. Application Data

[63] Continuation of Ser. No. 759,410, Jul. 26, 1985, abandoned.

[30] Foreign Application Priority Data

Jul. 30, 1984 [JP] Japan ................................ 59-157620
Feb. 12, 1985 [JP] Japan ................................ 60-23568
Jul. 1, 1985 [JP] Japan ................................ 60-142608
Jul. 1, 1985 [JP] Japan ................................ 60-142609

[51] Int. Cl.⁴ .............................................. B01D 53/34
[52] U.S. Cl. .................................... 423/240; 423/244
[58] Field of Search ............ 423/240 S, 244 R, 244 A

[56] References Cited

U.S. PATENT DOCUMENTS

| | | | |
|---|---|---|---|
| 1,145,579 | 7/1915 | Garner | 423/244 R |
| 4,436,701 | 3/1984 | Richter et al. | 423/244 R |
| 4,472,363 | 9/1984 | Poller et al. | 423/240 S |
| 4,548,797 | 10/1985 | Sauer et al. | 423/240 S |
| 4,555,391 | 11/1983 | Cyran et al. | 423/244 A |
| 4,670,237 | 6/1987 | Graf et al. | 423/244 A |

OTHER PUBLICATIONS

Gas Purification, 3rd ed. Kohl & Riesenfeld Gulf Publishing Co. 1979, pp. 358-359, 362-363.
Chemical Engineers-Handbook, 5th ed. Perry & Chilton McGraw-Hill Book Co. 1973, pp. 20-74.

Primary Examiner—John Doll
Assistant Examiner—Jeffrey Edwin Russel

[57] ABSTRACT

The present invention is directed to a method for treating an exhaust gas which comprises cooling an alkaline neutralizing agent powder and blowing the cooled powder into the exhaust gas in order to remove acidic gaseous components from the exhaust gas, and recovering the used alkaline neutralizing agent, cooling it, and utilizing it again in order to remove acidic gaseous components from the exhaust gas.

5 Claims, 2 Drawing Sheets

METHOD FOR TREATING EXHAUST GAS

This is a continuation of application Ser. No. 759,410, filed July 26, 1985, now abandoned.

FIELD OF THE INVENTION

The present invention relates to a method for treating exhaust gases from municipal garbage incinerating plants and the like, and more particularly it relates to a method for removing acidic gaseous components from the exhaust gases at low costs.

DISCUSSION OF PRIOR TECHNIQUES

Heretofore, a dry exhaust gas treatment has been suggested in which commercially available slaked lime or the like, is blown into a gas having a relatively low temperature of 150° to 450° C. in order to react the slaked lime with the acidic gaseous components, thereby removing the latter from the exhaust gas.

With that treatment, the conversion of slaked lime is within the range of 11 to 15%, in, for example, a direct dehydrochlorination process (powder-blowing process) in a low-temperature zone, depending upon the concentration of the acidic gaseous components in the exhaust gas and the amount of the slaked lime supplied.

In that method, since the reaction is carried out between the gases and the solid, the conversion of the slaked lime is only 11 to 15%. Additionally it is difficult to improve the removal efficiency of the acidic gaseous components in proportion to an increased feed of the slaked lime. The reason is that the reaction of the slaked lime in the exhaust gas is immediately completed as soon as the slaked lime is blown thereinto and afterward its conversion remains low.

Furthermore, the technique employed at present does not contemplate recovering the used slaked lime and thus the latter is disposed of as a dust without any treatment. In short, a material including 85 to 89% of the unreacted slaked lime is discarded. Clearly, recovery and recycling of the lime would reduce costs.

Accordingly, an object of the present invention is to provide a method for treating an exhaust gas wherein slaked lime is recycled to enhance its conversion by 2 or 3 times as much as that of the prior art technique and to thereby decrease the operational costs of the treating method and apparatus.

Another object of the present invention is a method wherein, a cooling treatment is carried out as a pretreatment prior to blowing slaked lime into the exhaust gas in order to cause the temperature of the slaked lime to fall to the lowest temperature possible, so that the above-mentioned object can be achieved.

SUMMARY OF THE INVENTION

The present invention is a method for treating an exhaust gas which comprises cooling an alkaline neutralizing agent powder and blowing the cooled powder into the exhaust gas in order to remove acidic gaseous components from the exhaust gas.

The present invention also provides a method for treating an exhaust gas which comprises recovering the used alkaline neutralizing agent, cooling it, and utilizing it again in order to remove acidic gaseous components from the exhaust gas.

According to the present invention, a cooling treatment is carried out as a pretreatment for the recycling of the used slaked lime in order to cool the discharged slaked lime to its dew point or less, and the cooled slaked lime is then blown into the exhaust gas in order to take part in the removal reaction of the acidic gaseous components again.

The exhaust gas to which the method of the present invention can be applied contains one or more acidic gaseous components. Examples of these acidic gaseous components include hydrogen chloride (HCl), sulfur oxides ($SO_2$, $SO_3$), hydrogen fluoride (HF) and the like.

DISCLOSURE OF THE BEST MODES

In the present invention, examples of usable alkaline neutralizing agents include slaked lime, calcium carbonate, quick lime, $Na_2CO_3$, $NaHCO_3$, $MgO$, $Mg(OH)_2$, $MgCO_3$, $FeO$, $Fe_2O_3$, $Fe(OH)_3$, $FeCO_3$, $Fe_2(CO_3)_3$, $NiO$, $Ni(OH)_2$, $NiCO_3$, $BaO$, $Ba(OH)_2$, $BaCO_3$, $ZnO$, $Zn(OH)_2$, $ZnCO_3$, $CuO$, $Cu(OH)_2$, $CuCO_3$ and the like, and they may be used alone or in mixtures thereof.

Figure 1:
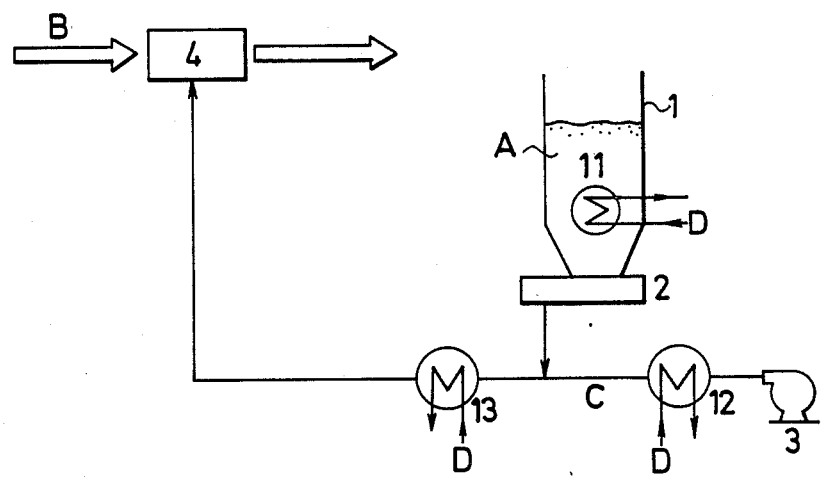
FIG. 1 is a flow sheet illustrating one embodiment of a method according to the present invention.

In FIG. 1, an alkaline neutralizing agent (slaked lime) A which is stored in a slaked lime silo 1 is discharged therefrom through a feeder 2 for quantitatively feeding the slaked lime A and is then fed to a powder-jetting device 4 by a blower 3. Exhaust gas B from an incinerator is also fed to device 4, and the slaked lime is then jetted into the exhaust gas B now passing through the device 4, so that the slaked lime will bring about the neutralization reaction with acidic gaseous components in the exhaust gas.

As one ment of cooling the slaked lime A, cooling devices 11, 12 and 13 are disposed at a lower portion in the silo 1, at an outlet of the blower 3 and on a carrying line C for the slaked lime A. In this case, the respective cooling devices 11, 12 and 13 may be disposed at all of the above-mentioned positions, alternatively one or two of these cooling devices may be placed at optional positions thereof. Symbol D in FIG. 1 represents a refrigerant.

When the slaked lime at ordinary temperature is brought into contact with the high-temperature exhaust gas, moisture in the exhaust gas will condense on the surfaces of the slaked lime powder and the condensed water will effectively accelerate the neutralization reaction of the slaked lime powder with the acidic gaseous components in the high-temperature exhaust gas.

According to the present invention, since the slaked lime A is cooled, the amount of condensed water increases and the above-mentioned condensation phenomenon is accelerated.

As in the present invention, if the temperatures of the slaked lime and of the air carrying it are further lowered, moisture in the carrying air will also be condensed on the surfaces of the slaked lime powder, with the result that the above-mentioned functional effect of accelerating the reaction will be increased.

Figure 2:
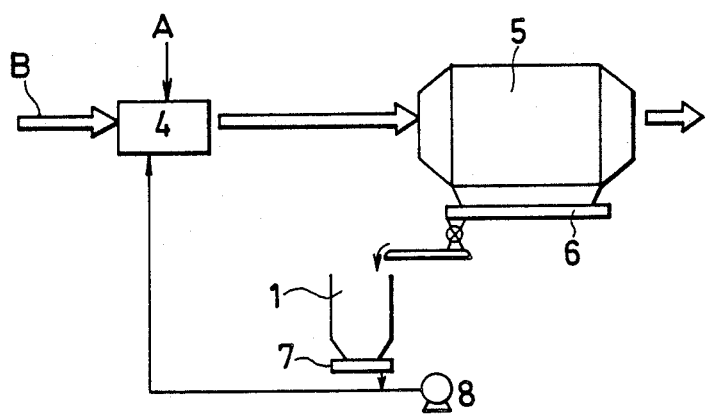
FIG. 2 is a flow sheet illustrating another embodiment thereof.
Figure 3:
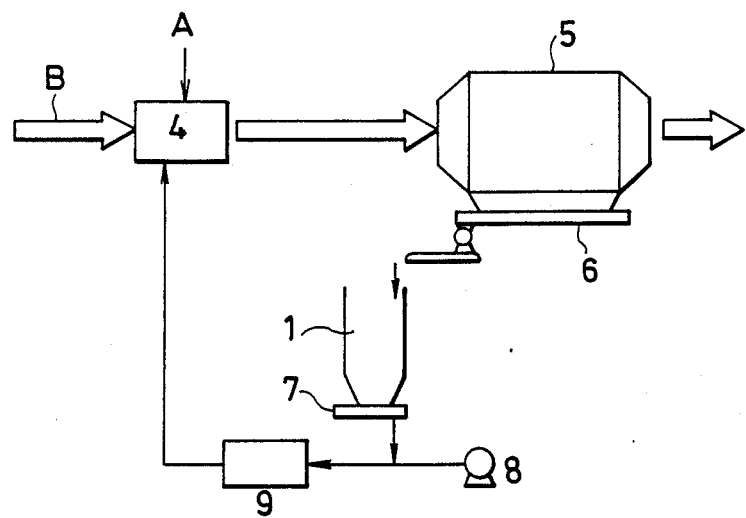
FIG. 3 is a flow sheet illustrating still another embodiment thereof.

FIGS. 2 and 3 show other embodiments of the present invention."

In these modifications, the slaked lime A is fed, through the powder-jetting device 4, into the exhaust gas B issuing from an incinerator, so that the neutralization reaction occurs between the slaked lime A and the acidic gaseous component, e.g., hydrogen chloride in the exhaust gas. The slaked lime is collected by an electrical dust collector 5 together with burned dust.

The thus collected ash (hereinafter referred to as EP ash) is carried to an EP ash storage tank 1 via a rotary valve 6 for discharging the ash from the collector 5 and is then stored in the tank 1. Afterward, the ash is discharged therefrom by a feeder 7 for quantitatively supplying it, and then fed to the powder-jetting device 4 again by the blower 8, to be dispersed into the exhaust gas. At this time, the EP ash discharged from the electrical dust collector 5 has a high temperature of 230° to 280° C. As described above, unreacted slaked lime in the EP ash at such a high temperature is not very reactive, under which conditions the cyclic utilization of the slaked lime is useless. For this reason, it is required to lower the temperature of the EP ash.

Cooling is effected by the systems shown in FIGS. 2 and 3. That is to say, the temperature of the EP ash is lowered to the dew point or less of the exhaust gas, as described below. This low temperature is reached by using air for feeding the EP ash which is introduced through the blower 8, if the temperature of the atmospheric air is low (FIG. 2). However, if the temperature of air in the atmosphere is high, a cooling device 9 should be disposed on the EP ash feeding line to cool the EP ash, as shown in FIG. 3. Such a cooling device 9 may comprise a system containing a water-cooling jacket, a system in which fins are windingly provided along the carrying line, or a system having a cooling unit.

The EP ash which has been cooled to a desired temperature in such a manner as described above is dispersed again into the exhaust gas in the powder-jetting device 4, so that it is subjected the neutralization reaction with the acidic gaseous component, e.g., hydrogen chloride.

Figure 4:
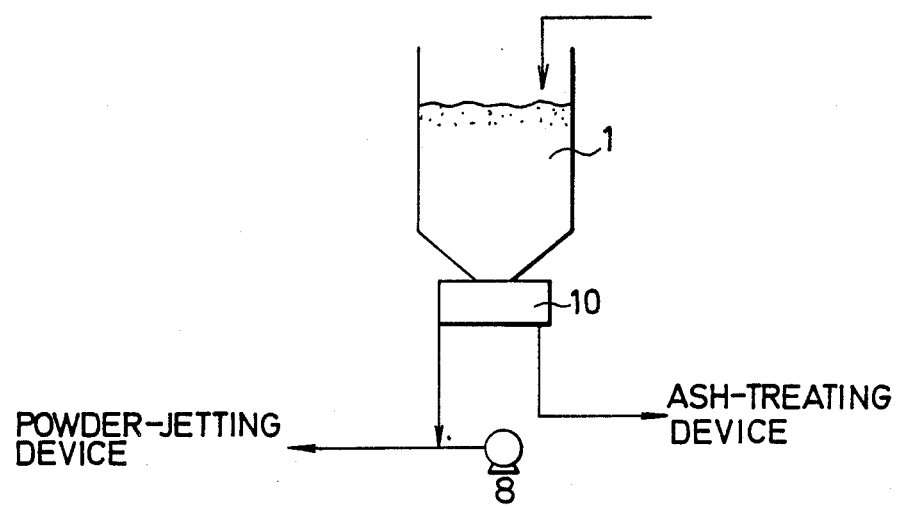
FIG. 4 is a partial flow sheet illustrating a further embodiment thereof, and the same numerals and symbols in the drawings represent the same members therein.

In an additional embodiment shown in FIG. 4 in which the EP ash is reutilized, a bidirectional feeder 10 for quantitatively feeding the EP ash may be disposed at an outlet of the EP ash storage tank 1 so that the feed of the EP ash to the refeed line may be controlled and so that the remaining EP ash may be discharged therefrom to an ash treating device.

The EP ash is discharged from the electrical dust collector (i.e., EP) in a completely dry state and at a high temperature of 230° to 280° C. When this EP ash is cooled to the lowest temperature possible and is brought into contact with the high-temperature exhaust gas, a part of the moisture contained in the exhaust gas will condense because of the temperature difference between the EP ash and the exhaust gas. The thus condensed water functions to effectively accelerate the neutralization reaction of the unreacted slaked lime with the acidic gaseous components in the high-temperature exhaust gas. Therefore, if the EP ash is refed at a high temperature, such a high reactivity of the ash as described above cannot be obtained. Further, it will be understood that the temperature of the cooled EP ash preferably is equal to the dew point temperature of the exhaust gas or lower.

EXAMPLE 1

Samples of an alkaline neutralizing agent ($Ca(OH)_2$ was used) were cooled to 20° C. and 10° C. according to the method of the present invention and blown into an exhaust gas having a temperature of 300° C. to remove hydrogen chloride. In Table 1 below, the hydrogen chloride removal rate is compared with those of the prior art in which the neutralizing agent at room temperature (30° C.) was blown into the exhaust gas having a temperature of 300° C.

TABLE 1

|  | Conventional Example | Examples of Present Invention | |
| --- | --- | --- | --- |
| Temp. of Exhaust Gas | 300° C. | 300° C. | 300° C. |
| Temp. of Cooled Neutralizing Agent | 30° C. | 20° C. | 10° C. |
| Removal Rate of Hydrogen Chloride | 40% | 47% | 55% |

It is clear from the results in Table 1 above that the lower the temperature of the cooled neutralizing agent, the higher the removal rate of hydrogen chloride.

EXAMPLE 2

The procedure of Example 1 was repeated with the exception that an exhaust gas containing sulfur oxides (SOx) as acidic gaseous components was used. The results are set forth in Table 2.

TABLE 2

|  | Conventional Example | Examples of Present Invention | |
| --- | --- | --- | --- |
| Temp. of Exhaust Gas | 300° C. | 300° C. | 300° C. |
| Temp. of Cooled Neutralizing Agent | 30° C. | 20° C. | 10° C. |
| Removal Rate of Sulfur Oxides | 20% | 28% | 35% |

As is apparent from the results in Table 2 above, the lower the temperature of the cooled neutralizing agent, the higher the removal rate of sulfur oxides of the acidic gaseous components.

According to the present invention, the reactivity of the alkaline neutralizing agent can be increased and thus the removal rate of the acidic gaseous components is enhanced. Further, if the same removal rate of the acidic gaseous components as in the prior art technique suffices, amount of the alkaline neutralizing agent used can be reduced, leading to a noticeable decrease in treatment costs.

What is claimed is:

1. A method for removing HCl gas component from an exhaust gas which is at a temperature above its dew point comprising, collecting used slaked lime powder, cooling the used slaked lime powder to below the dew point of said exhaust gas, and blowing said cooled powder into said exhaust gas in order to remove the HCl gas component from said exhaust gas.

2. The method according to claim 1, for treating a moisture-containing exhaust gas from garbage incinerating plants having an incinerator, comprising in combination: quantitatively supplying said cooled slaked lime powder to a powder-jetting device; conveying said gas from said incinerator to said device to neutralize the HCl gas component in said gas and collecting a hot ash containing dust and the used slaked lime.

3. The method of claim 2, wherein said hot ash is cooled to between 10° and 20° C.

4. The method of claim 1, wherein said gas contains moisture, and wherein blowing said cooled powder into said gas further comprises condensing at least a part of the moisture.

5. The method of claim 1, wherein the used slaked lime powder is cooled to between 10° and 20° C. to remove HCl at a rate of about between 47 and 55%.

* * * * *